US011270025B2

(12) United States Patent
Arnold

(10) Patent No.: US 11,270,025 B2
(45) Date of Patent: Mar. 8, 2022

(54) ANONYMIZED GLOBAL OPT-OUT

(71) Applicant: LiveRamp, Inc., San Francisco, CA (US)

(72) Inventor: James Q. Arnold, Tiburon, CA (US)

(73) Assignee: LiveRamp, Inc., San Francisco, CA (US)

( * ) Notice: Subject to any disclaimer, the term of this patent is extended or adjusted under 35 U.S.C. 154(b) by 380 days.

(21) Appl. No.: 16/513,465

(22) Filed: Jul. 16, 2019

(65) Prior Publication Data

US 2021/0019445 A1    Jan. 21, 2021

(51) Int. Cl.
| | | |
|---|---|---|
| *G06F 21/62* | (2013.01) | |
| *H04L 9/06* | (2006.01) | |
| *G06F 21/60* | (2013.01) | |

(52) U.S. Cl.
CPC ........ *G06F 21/6254* (2013.01); *G06F 21/602* (2013.01); *H04L 9/0643* (2013.01)

(58) Field of Classification Search
CPC ... G06F 21/6254; G06F 21/602; H04L 9/0643
See application file for complete search history.

(56) References Cited

U.S. PATENT DOCUMENTS

| | | | |
|---|---|---|---|
| 9,262,623 B2 | 2/2016 | Stecher | |
| 10,044,665 B2 | 8/2018 | Le Jouan | |
| 10,289,868 B2 | 5/2019 | Jagadish et al. | |
| 10,990,686 B2 * | 4/2021 | Roullier | .................. G06F 21/60 |
| 2007/0299721 A1 * | 12/2007 | Robinson | ............... G06Q 30/04 |
| | | | 705/13 |
| 2011/0208850 A1 | 8/2011 | Sheleheda et al. | |
| 2012/0278137 A1 * | 11/2012 | Dixon | ................ G06Q 20/4016 |
| | | | 705/13 |
| 2014/0344015 A1 * | 11/2014 | Puertolas-Montanes | ..................... |
| | | | G06Q 30/0217 |
| | | | 705/7.29 |
| 2014/0373182 A1 * | 12/2014 | Peri | ..................... G06F 21/6245 |
| | | | 726/30 |
| 2015/0149765 A1 | 5/2015 | Pauliac et al. | |
| 2016/0147945 A1 | 5/2016 | MacCarthy et al. | |
| 2016/0232570 A1 * | 8/2016 | Wilson | ............... G06Q 30/0257 |
| 2016/0292456 A1 * | 10/2016 | Dubey | .................. G06Q 10/10 |

(Continued)

OTHER PUBLICATIONS

Arnason, Einar, "Personal Identifiability in the Icelandic Health Sector Database," JILT (2002).

(Continued)

*Primary Examiner* — J. Brant Murphy
*Assistant Examiner* — Stephen T Gundry

(57) ABSTRACT

A system for managing opt-out instructions includes a global opt-out service and opt-out store in communication with regional subsystems. The opt-out service maintains a global opt-out store database of consumers for whom opt-out instructions have been received. The opt-out store includes no personal data, but instead contains only anonymized data. Before consumer data is utilized, an anonymized identifier is created by a regional data anonymizer and transmitted to the opt-out store. The opt-out instructions are applied by searching for a match in the opt-out store for a matching anonymized identifier. In this manner, the system may comply with privacy laws and regulations concerning the transmission of personal data outside of a region, while still providing a global opt-out service.

17 Claims, 2 Drawing Sheets

(56) References Cited

U.S. PATENT DOCUMENTS

| | | | | |
|---|---|---|---|---|
| 2017/0180797 | A1* | 6/2017 | Splaine | H04L 67/20 |
| 2017/0207916 | A1* | 7/2017 | Luce | G06F 21/6254 |
| 2017/0243028 | A1* | 8/2017 | LaFever | G06F 21/6263 |
| 2017/0359313 | A1 | 12/2017 | Livneh et al. | |
| 2017/0372096 | A1* | 12/2017 | Yousfi | G16H 10/60 |
| 2018/0307859 | A1* | 10/2018 | LaFever | G16H 10/60 |
| 2018/0332008 | A1* | 11/2018 | Norman | H04L 63/0421 |
| 2019/0149625 | A1 | 5/2019 | Garon et al. | |
| 2019/0156060 | A1 | 5/2019 | Maier et al. | |
| 2019/0332807 | A1* | 10/2019 | LaFever | H04L 63/0407 |
| 2019/0372940 | A1* | 12/2019 | McDougall | G06F 21/10 |
| 2020/0026879 | A1* | 1/2020 | Barday | G06F 21/6227 |
| 2020/0097679 | A1* | 3/2020 | Fisse | G06F 21/6254 |
| 2020/0151360 | A1* | 5/2020 | Zavesky | G06F 21/6218 |
| 2020/0159955 | A1* | 5/2020 | Barlik | G06F 21/604 |
| 2020/0272764 | A1* | 8/2020 | Brannon | G06F 21/6218 |
| 2020/0336449 | A1* | 10/2020 | Parkinson | H04L 67/02 |
| 2020/0401708 | A1* | 12/2020 | Friedman | G06F 21/604 |

OTHER PUBLICATIONS

Bregman-Eschet, Yael, "Genetic Databases and Biobanks: Who Controls Our Genetic Privacy?" Santa Clara Computer & High Technology Journal 23.1: 1(54) (Nov. 2006).

Emam, Khaled et al., "A Globally Optimal k-Anonymity Model for the De-Identification of Health Data," J. Am. Med Inform. Assoc. 16:670-682 (2009).

\* cited by examiner

ANONYMIZED GLOBAL OPT-OUT

TECHNICAL FIELD

The field of the invention is systems and methods for managing consumer data, and in particular systems and methods for managing opt-out requests with respect to consumer data.

BACKGROUND ART

Consumer data is commonly collected in large databases for use in targeted marketing efforts. Some such databases contain records for tens of millions of consumers, with each record including not only identifying data such as name and address, but also hundreds or even thousands of fields that contain information about a consumer's spending habits, hobbies and interests, life stage, and purchasing propensities. These fields allow a marketer to target a product or service marketing message to a particular consumer audience that is most likely to be interested in the product or service. This targeting increases the return on investment (ROI) for the marketer because a larger percentage of the consumers in this particular audience are likely to respond positively to the marketing message, leading to increased sales for the source of the product or service.

The existence of such large, comprehensive databases has raised important privacy concerns. Consumers wish to know how their personal data is used, to whom this data is disclosed, and the level of security that is being exercised by the database administrators to protect this data from misuse such as identity fraud. A number of high-profile data breaches in recent years have heightened these concerns. Although a patchwork of privacy laws and regulations have been enacted over the years in an effort to address particular concerns regarding use and misuse of consumer data, a more recent trend is the enactment of comprehensive privacy laws or regulations that create specific rights for consumers with respect to the collection and use of data concerning those consumers. Such laws and regulations include the General Data Protection Regulation (GDPR) for the European Union, and the California Consumer Privacy Act of 2018 (CCPA).

The rights granted to European residents under the GDPR and California residents under the CCPA are broad. While specific implementational details differ, these rights generally include the right for consumers to request a report of their personal data held by a data controller; the right to require rectification of mistakes in their personal data held by the data controller; the right to direct a data processor not to process the consumer's personal data; and the right to direct a data controller to delete the consumer's personal data.

The GDPR refers to natural persons whose data is subject to the regulation as "data subjects." This term will be used interchangeably with "consumer" herein, but it should be understood that both terms can mean any natural person about whom data is collected. The GDPR does not specifically label any right of a data subject as an "opt-out" right. But for purposes herein, any of the rights granted to a consumer that in some manner allow the consumer to limit the use of his or her data, or require the deletion of his or her data, shall be referred to as "opt-out" rights. Such rights have existed, in some form and in various jurisdictions, for some time. In addition, industry standards and best practices that pertain to those in the consumer data industry have for quite some time called for the data controller or the data processor to allow users to exercise certain types of opt-out rights. Thus many data controllers have provided certain categories of opt-out rights to their consumers in the past. But the trend, as demonstrated by the GDPR and CCPA, has been to expand the scope of these rights for all consumers, and thus require the implementation of technical changes to the databases and related technology maintained by data controllers in order to comply with these requirements.

Another concern addressed by the GDPR is the export of a consumer's data to another region where the GDPR does not apply. (For purposes herein, the general term "region" will mean not only its narrow definition within the GDPR, but more generally any country, state, jurisdiction, or other geopolitical area that may have its own distinct privacy laws or regulations, or which may be treated as a separate jurisdiction for any reason within the scope of any more broadly applied privacy law or regulation.) If the export of such data were allowed, then it would be relatively easy to circumvent the protections of the GDPR and similar laws and regulations by simply moving the data to a different jurisdiction before storage and processing. Therefore, data controllers or processors with access to data concerning EU residents must ensure that their systems limit the export of that data in a compliant manner.

When a consumer submits an opt-out instruction to a data controller, it is natural that the consumers expects the opt-out instruction to be implemented with respect to that consumer's data regardless of the region in which the data was collected. For example, a resident of France who submits an opt-out instruction under the GDPR would likely be surprised if the instruction were applied only against data collected about that consumer in France, while leaving unaffected data collected about that same consumer in the US. Critically, personal data for this consumer cannot be transferred outside of France in order to perform the opt-out processing. Existing opt-out systems would be unable to provide a global opt-out while still maintaining compliance with the GDPR because they rely upon the use of personal data. Thus it would be highly desirable for a data controller or processor to employ a system and method for managing opt-out instructions that is not limited to the region in which the data is collected, but rather can be applied inter-regionally or globally. At the same time, such a system and method must be structured so that it complies with the GDPR, CCPA, and all other applicable privacy laws and regulations, including those likely to be implemented in the future.

References mentioned in this background section are not admitted to be prior art with respect to the present invention.

SUMMARY OF THE INVENTION

The present invention is directed to a system and method for managing opt-out instructions across multiple regions using a global opt-out service and opt-out store. The opt-out store includes a database of consumers for whom opt-out instructions of various types have been received, but the opt-out store includes no personal data for any of these consumers. Instead, only anonymized data is maintained in the opt-out store. Before consumer data is utilized, an anonymized identifier is created by a local data anonymizer and transmitted to the opt-out store. The opt-out instructions are applied by searching for a match in the opt-out store for the anonymized information about each consumer. In this manner, the system and method may comply with provisions of various privacy laws and regulations concerning the transmission of personal data outside of a particular region, while simultaneously providing a global opt-out service to meet consumer expectations rather than one that is limited to data collected in a particular region.

These and other features, objects and advantages of the present invention will become better understood from a consideration of the following detailed description of the preferred embodiments and appended claims in conjunction with the drawings as described following:

DESCRIPTION OF EMBODIMENTS

The present invention will be described below with reference to one or more specific implementations; it is understood, however, that these implementations are not limiting to the invention, and the full scope of the invention is as will be set forth in any claims directed to the invention in this or a subsequent application directed to the invention.

Prior to the discussion of implementations of the present invention, prior art systems will be described with reference to FIG. 1. In this example, there are three regional opt-out systems for each of the United States, France, and the United Kingdom, but it will be understood that the number of regional systems is only meant as an illustrative example, and not a complete description of prior art systems for processing opt-out requests. It will also be understood that the prior art example of FIG. 1 is a hypothetical attempt utilizing current technology to solve opt-out requests while complying with the GDPR and similar laws and regulations, and does not necessarily represent any particular real-world system or group of systems.

Figure 1:
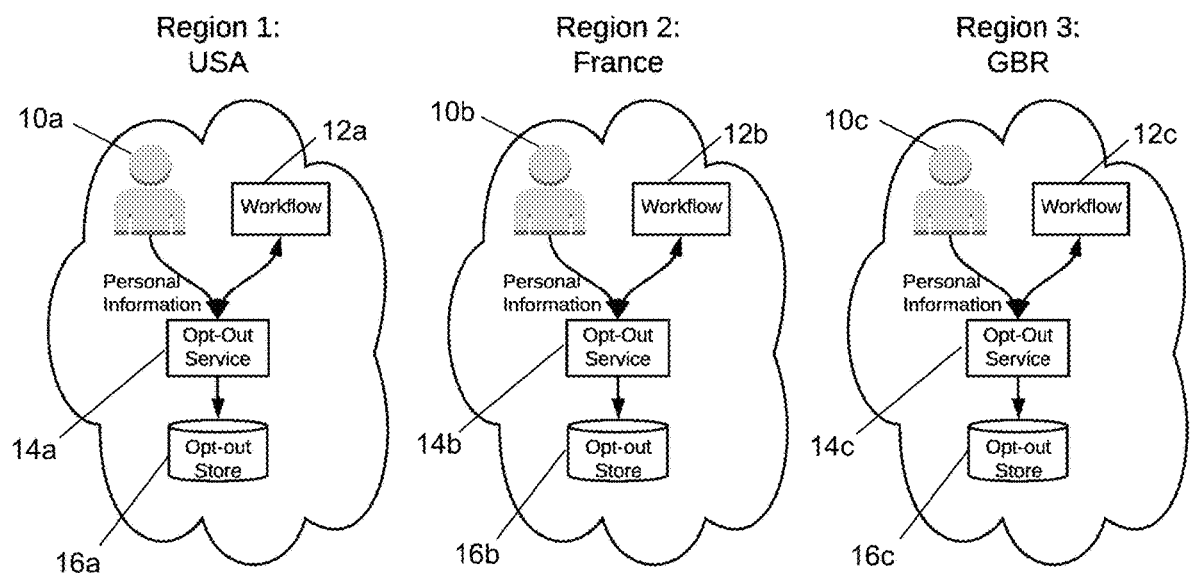
FIG. 1 is a flow diagram of a regional opt-out system according to the prior art.

The prior art system of FIG. 1 is divided into three separate subsystems. Each subsystem corresponds to consumers and data collected about those consumers in a particular region. The components with reference numerals ending in "a" all correspond to components of a subsystem for a first region, and likewise reference numerals ending in "b" and "c" corresponding to a second and third region, respectively. It will be understood that the like-numbered components with different letter suffixes are analogous but are components of different regional subsystems. Descriptions of components with reference numerals that end in "x" herein shall apply equally to the corresponding components in each regional subsystem, such as "10x" referring to each of the components numbered in FIG. 1 with reference numerals 10a, 10b, and 10c.

Consumers 10x may decide to make an opt-out request through their local computing device, which may be, for example, a desktop computer, a laptop computer, an electronic tablet, a smartphone, or the like. (Note that 10x may also refer to the device or software utilized by the consumer for the opt-out request.) This opt-out may be performed by accessing a website, hosted at a website server. Opt-out services 14x are used to determine if a consumer has made an opt-out request before that consumer's data is used for a targeted marketing message. Before a consumer's data is used for a marketing purpose, identifying data about that consumer is transferred from a consumer 10x to a corresponding opt-out service 14x. The identifying data may be direct personal data about the consumer, such as name and address data. The opt-out service 14x takes this data it receives from the corresponding consumer 10x, and then uses this data to search opt-out store 16x for a match. Workflows 12x represent the processing associated with generating targeted messages. They are not intended to control flow from consumer 10x to opt-out service 14x. So as the workflow 12x processes data, it consults the opt-out service 14x to see if a particular consumer has been opted out. If so, it suppresses any targeted messages.

Each opt-out store 16x is a database with records for each consumer about whom the service is aware. Opt-out stores 16x are used to store an opt-out list that includes personal data about consumers that corresponds to the type of data sent in the message from opt-out service 14x in order to run the match procedure. For example, if name and address data are sent from the consumer 10x, then the opt-out store will contain records that each contain the corresponding name and address information, along with a field that indicates whether or not the consumer has made an opt-out request, and (optionally) the type of opt-out request if the opt-out request has been made. If a match is found in response to the search of an opt-out store 16x by the corresponding opt-out service 14x, then opt-out service 14x returns a positive result for the presence of the consumer on the opt-out list. This indicates that the consumer's data is not to be used for a marketing purpose, or (optionally) may indicate specific restrictions on the use of the consumers' data for marketing purposes, which—depending on the type of marketing message being proposed—may indicate that the consumer's data is not to be used in a marketing message of this type. Otherwise, if a negative result is returned from opt-out service 14x, or the opt-out indicator does not indicate that the consumer has opted out of this particular use of that consumer's data, then the proposed marketing use of the data may proceed normally.

A system such as described with respect to FIG. 1 may be used for real-time applications. For example, when determining whether a banner ad or other digital ad will be served in response to a user navigating to a particular web page, the opt-out services 14x must operate so quickly that there is no appreciable delay caused by the check to determine whether there is an opt-out request on file for this particular customer; otherwise, the delay will interfere with the consumer's web browsing experience and may discourage the user from engaging with any brands that are being marketed to the consumer in this manner. It is apparent then that opt-out services 14x must operate at a very high speed, and opt-out stores 16x must be structured in such a manner that they can be searched sufficiently quickly to enable real-time return of results during a browsing session by a user.

In reviewing FIG. 1 as a whole, it will be apparent that the three systems implemented in the three example regions (the US, France, and UK) operate entirely separate from each other. Such a system can be made to operate within the confines of the GDPR and similar laws and regulations, because there is no consumer personal data that is leaving the jurisdiction in which the information has been collected. For example, a French consumer will have personal data in database 16b physically located in France, and no part of the processing requires that any of that personal data leave France. But the opt-out processing provided by opt-out service 14b is only useful with respect to data collected about this consumer within the region of France. If, for example, there were other data collected about this consumer in the US, and an ad were being set for the French user when visiting a US website, then opt-out service 14a (operating in the US region) will have no way to know about the opt-out request made in France because opt-out store 16a only contains information about opt-out requests in the US region. So the French user in this example will receive ads when visiting a US website, even though the French user has submitted an opt-out request with respect to his or her data.

In a simplified version of this example, suppose John Doe contacts company C to stop directed ads sent to him. Because John lives in the EU, his request is directed to company C's EU website. John may say, "My email is j.doe@mail.com. Please stop sending me ads." In response, Company C adds John's name and email address to its opt-out list. Thereafter, when Company C prepares its advertising, it suppresses ads for j.doe@mail.com. But because John's name and email address are considered personal data under the GDPR, that personal data cannot be transferred outside of the EU. If Company C is a multinational company, with operations in the US, EU, and Australia, the EU opt-out list must stay inside the EU. This has an unintended consequence for data subjects. Suppose the US branch of Company C has John's name and email, because John visited New York City and signed up for discounted theater tickets while there. The US branch of Company C might send ads to John, because it cannot see the EU opt-out list. Even though John had specifically contacted Company C, that opt-out request would be restricted to the EU.

Consumers naturally expect that an opt-out request will be honored with respect to their data regardless of where the data is collected or used. Consumers generally may not know what type of data is collected about them in any particular region or regions. Thus the expectations of the French consumer in the preceding example will be frustrated when visiting a US website because the opt-out request is not being honored there. The consumer may believe that the marketer is deliberately ignoring the opt-out request made by that consumer, and thus the consumer will lose trust in the marketer or the brand being served by the marketer. Furthermore, the consumer may lose trust in the opt-out system altogether, feeling that there is no point in making opt-out requests because those requests are not honored. An angered consumer may report the situation to the enforcement authorities set out in the GDPR or similar laws and regulations, and even though the investigation may ultimately demonstrate that the marketer behaved within the law, significant governmental and commercial resources may be wasted in this investigation in order to ultimately conclude that no enforcement is actually necessary. Finally, the brand that was being marketed to the consumer will be harmed because the consumer—who may know little to nothing about the actual workings of digital advertising—will remember seeing this brand's message at a time when the consumer expects that the targeted messaging should have been blocked. Thus the consumer is left with a bad experience associated with this brand, even though the brand is spending money in order to present marketing messages to similarly situated consumers in the hopes of approving the brand's standing with the consumers and ultimately leading to increased sales.

Figure 2:
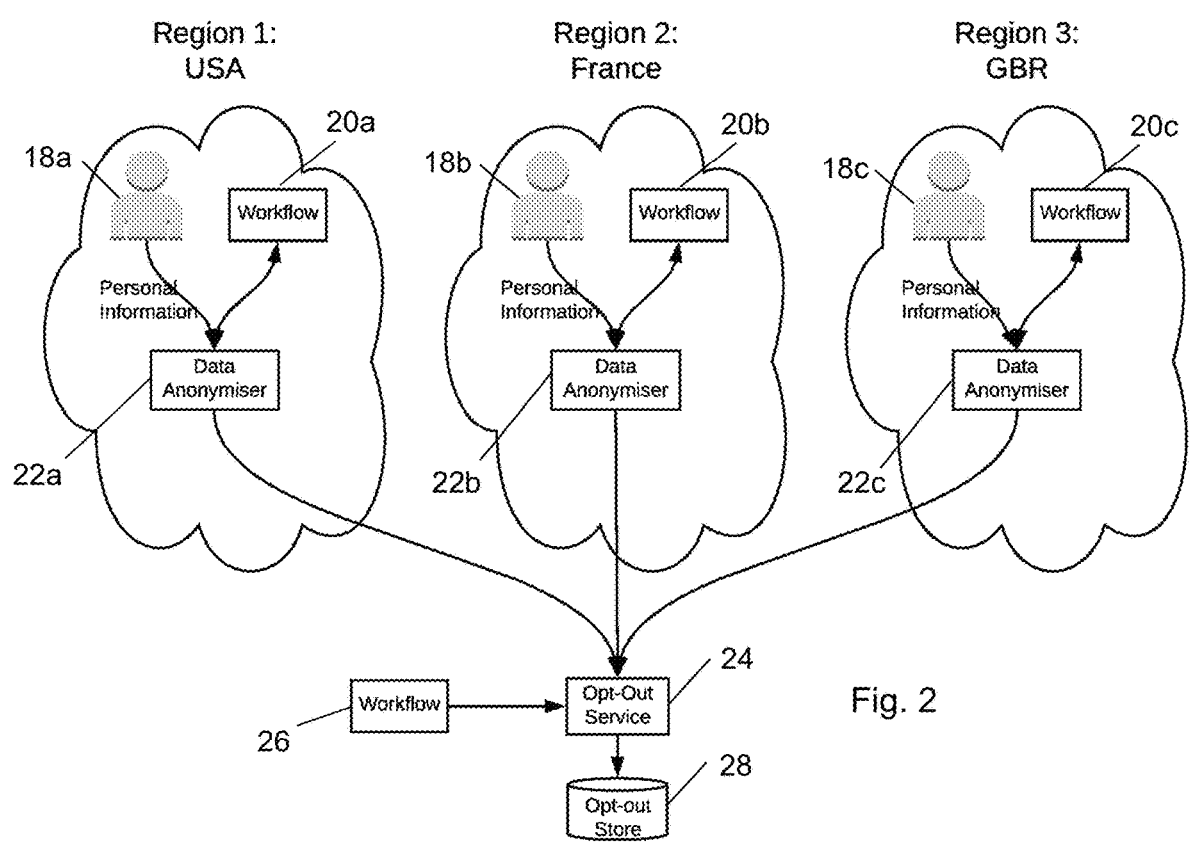
FIG. 2 is a flow diagram of a global opt-out system according to an implementation of the present invention.

Turning now to FIG. 2, an implementation of the present invention may be described that solves the problems identified with respect to the prior art system of FIG. 1. Consumers 18x (or consumer devices or software 18x) in FIG. 2 are broadly similar to consumers 10x as described above with reference to FIG. 1. As noted previously, the personal data from consumers 18x cannot be sent outside of the jurisdiction where it is collected and physically stored.

Unlike the system shown in FIG. 1, the system according to the implementation of the present invention as shown in FIG. 2 includes data anonymizers 22x. The purpose of anonymizers 22x is to take personal data from consumers 18x and create an anonymous identifier that can be transferred outside of the region where each subsystem is located. In various embodiments of the present invention, the anonymized identifier can be created in any manner so long as the result can be uniquely associated with an individual consumer and the consumer's personal data cannot be calculated (or at least cannot be calculated within a commercially reasonable timeframe) using the anonymized identifier. In one particular implementation, data anonymizers 22x may create the anonymized identifier by the application of one or more one-way algorithms, particularly one-way secure hash algorithms, to some portion or all of the consumer's personal data. As an example, the full name and address data for the consumer from the corresponding one of databases 18x may be concatenated together in a particular format, and used as the input for the corresponding data anonymizer 22x. The algorithm applied will then create an output anonymized identifier that is unique with respect to consumers who have that exact same name and address data, but is commercially impossible to process in reverse to derive any personal data from the anonymized identifier. Examples of secure hash algorithms include, for example, the SHA-256 algorithm created by the NSA, which outputs a 256-bit result after 64 rounds of logical operations. In other particular implementations, a double hashing technique may be employed. In this approach, the output of a first hashing algorithm is fed to a second hashing algorithm (which may be computationally the same as the first algorithm or a different algorithm). In this way, an even more secure anonymized identifier may be created.

Global opt-out service 24 is in communication with each data anonymizer 22x and is controlled by global opt-out service workflow 26. Global opt-out service 24 may be physically located in any region of the world. It may be in one of the countries where a regional subsystem of the implementation of the invention is also located. For example, in the example of FIG. 2, the global opt-out service 24 may be physically located in the US, even though it is in communication with subsystems located not only in the US but also in France and the UK. In other implementations, global opt-out service 24 may be located in a region that does not physically include any regional subsystem that is a part of the system. Communication between data anonymizers 22x and global opt-out service 24 may be over any type of wide area network, including, for example, the Internet.

Prior to use of the system as illustrated in FIG. 2, there is a setup procedure for global opt-out store 28. Opt-out store 28 contains a number of records corresponding to each of the consumers in each of the applicable regions for which data is stored globally by the system. Each of these records on opt-out store 28 consist of a field for an anonymized identifier and a field indicating an opt-out status for the consumer associated with the anonymized identifier. This may simply be an indicator as to whether an opt-out request has been received for that consumer, or may be an indicator that further provides information about the type of opt-out request that has been received for that consumer. In order to populate global opt-out store 28, the set-up procedure requires transmission, from each data anonymizer 22x to global opt-out service 24, of an anonymous identifier for each consumer recognized by the system globally. Global opt-out service 24 then populates the records held in opt-out store 28 with these values. The anonymized identifiers are created by each data anonymizer 22x as described above. Because data changes over time, data anonymizers 22x may periodically update the opt-out store 28 in a similar manner. The updates may be performed in a batch mode with periodic updates from each data anonymizer 22x, such as monthly, weekly, or daily updates, or may be updated in real time as new data is received from consumers making opt-out requests 18x.

Each regional workflow 20x that processes personal data also may use the data anonymiser 22x and the opt-out service 24. The personal data would be matched with a particular consumer using the consumer's personal data used to create the anonymized identifier for this consumer at the corresponding data anonymizer 22x. The matched anonymized identifier for that consumer is than transmitted from the corresponding data anonymizer 22x to global opt-out service 24. The global opt-out store 28 is then queried with the opt-out data. Workflows that do not use personal data, such as 26, may run globally, without the requirement to process data only in the consumer's region.

In order to utilize the system as shown in FIG. 2 after the setup procedure, an opt-out request is received at one of the regional subsystems from a particular consumer. The consumer personal data submitted in the opt-out check is anonymized (22x), forwarded to the opt-out service (24), and entered in the corresponding opt-out database 28x. If the data is not provided by the consumer 18x in a standardized format, then the data may be standardized before or after it is transmitted to the corresponding data anonymizer 22x. After creating the anonymized identifier from this data, the corresponding data anonymizer 22x sends the generated anonymized identifier to global opt-out service 24, which allows workflow 26 to use the anonymized identifier it has received to look for a matching anonymized identifier stored in one of the records in global opt-out store 28. If a match is found, then the opt-out data is returned to the corresponding workflow 26. This may be, for example, an indication that the consumer has not made an opt-out request; that the consumer has made an opt-out request; or, if the consumer has made an opt-out request, the type of opt-out request that the consumer has made. This information is then used by the marketing system to determine next steps: proceed with the serving of the digital marketing message; suppress the potential digital marketing message; or alter the digital marketing message that is set in accordance with the particular type of opt-out request made by the consumer.

A follow-up example may be described, that corresponds with the example given above. Suppose that John Doe again initiates an opt-out request while still in the EU. His data are pseudonymized in the EU, the resulting data are transferred to a global opt-out service 24, and that global store is made available to the processing that occurs in multinational branches of Company C. When the US branch prepares targeted ads, it sees John in the global suppression list and omits the ads directed to him. This enhanced opt-out processing thus aligns with data subject expectations, while maintaining compliance with the GDPR restrictions on transfers of personal data.

With the foregoing description of the system according to FIG. 2, it will be seen that an opt-out request by a consumer in any region can be honored through multiple regions and even on a global basis. The system therefore meets the expectations of consumers who are making opt-out requests, who naturally desire that when an opt-out request is made the request not be limited to data stored in a particular region. At the same time, the system complies with the GDPR and similar laws and regulations because there is no personal data for any consumer that is being transmitted or physically stored on any equipment that is not physically within the same region as the consumer. Even if some or all of the data kept in the global opt-out store 24 were illegally accessed or stolen, the wrongdoer would have no ability to use this information illicitly because the anonymized identifiers are simply a string of numbers, characters, or some combination of the two, providing no means to recreate any consumer personal data. It is commercially impossible to back out from such anonymized identifiers any personal data about the corresponding consumer, and thus the information accessed or stolen would be meaningless to the wrongdoer. This would in turn discourage attempts to steal or hack this data, because there would be no value to the data even if it were stolen.

When the opt-out store contains personal data, each region must operate its own repository. By contrast, using pseudonymous data allows a single, global repository. This distinction significantly affects the operation of the system, from a data controller's perspective. In a regional repository model such as shown in FIG. 1, each region must operate its own repository. This implies duplication of hardware, physical facilities, electrical supply, cooling, networking, and personnel. Because the personal data must remain in the region, each region must have an operations staff to deal with local problems. Central (or global) staff would not be able to investigate all issues. Operations staff outside the region would be prohibited from examining data in the opt-out repository, because the data would need to leave the jurisdiction in order to be read. Staff in each region would require training and expertise to operate its service effectively. Maintaining personnel with the required expertise would increase costs significantly over a central system with a focused support team. On the other hand, operating a single, global opt-out repository reduces overhead in all of these dimensions.

Unless otherwise stated, all technical and scientific terms used herein have the same meaning as commonly understood by one of ordinary skill in the art to which this invention belongs. All terms used herein should be interpreted in the broadest possible manner consistent with the context. When a grouping is used herein, all individual members of the group and all combinations and subcombinations possible of the group are intended to be individually included in the disclosure. All references cited herein are hereby incorporated by reference to the extent that there is no inconsistency with the disclosure of this specification. If a range is expressed herein, such range is intended to encompass and disclose all sub-ranges within that range and all particular points within that range.

The present invention has been described with reference to certain preferred and alternative embodiments that are intended to be exemplary only and not limiting to the full scope of the present invention, as set forth in the appended claims.

The invention claimed is:

1. An electronic system for managing global opt-out requests, comprising:
   a. a plurality of regional subsystems comprising hardware configured to receive personal data from consumers, wherein the personal data comprises name data, address data, or both name and address data, wherein each of the plurality of regional subsystems are physically located in a different geopolitical region from the others of the plurality of regional subsystems, and further wherein each of the plurality of regional subsystems comprises:
      i. an opt-out website hosted at a web server and accessible by individual consumers; and
      ii. a data anonymizer in electronic communication with the web server comprising hardware configured to receive personal data from the consumer at the web server connected to such data anonymizer and to create an anonymized identifier from the personal data by performing a secure double hash on the personal data;

b. a global opt-out service comprising hardware connected to each of the plurality of regional subsystems by an electronic network; and c. an opt-out store comprising hardware in electronic communication with the opt-out service, wherein the opt-out store further comprises an opt-out database in communication with the opt-out service.

2. The system of claim 1, wherein the opt-out store comprises a plurality of records, wherein each record comprises:

a. an anonymized identifier corresponding to one of the consumers; and b. opt-out information pertaining to such consumer.

3. The system of claim 2, wherein the opt-out service is configured to receive the anonymized identifier from the data anonymizer and perform a search of the opt-out store for a record containing such anonymized identifier.

4. The system of claim 3, wherein the opt-out service is further configured to return opt-out information pertaining to one of the consumers to the one of the plurality of regional subsystems that sent a corresponding anonymized identifier.

5. The system of claim 4, wherein the plurality of regional subsystems and opt-out service are configured to perform processing in real time.

6. The system of claim 5, wherein each of the plurality of regional subsystems are further configured to send update information to the opt-out store over the electronic network, wherein the update information comprises an anonymized identifier and corresponding opt-out information for a corresponding one of the consumers, and wherein the opt-out store is further configured to receive the update information and either create a new record in the opt-out store or update an existing record in the opt-out store.

7. The system of claim 6, wherein at least one of the plurality of regional subsystems is configured to send update information in real time.

8. The system of claim 6, wherein at least one of the plurality of regional subsystems is configured to send update information in a periodic batch mode.

9. The system of claim 1, wherein each of the websites in the plurality of regional subsystems processes only data concerning consumers residing in the geopolitical region where the regional subsystem is physically located.

10. A method for managing global opt-out requests, the method comprising the steps of:

a. receiving, at one of a plurality of regional subsystems, a request to provide opt-out information prior to the setting of a digital marketing message to a person;

b. searching the one of the plurality of regional subsystems for a record corresponding to such person;

c. sending personal data from a consumer-accessible website hosted at a web server to a data anonymizer in electronic communication with the web server, wherein the personal data is stored and the data anonymizer is physically located in a same geopolitical region;

d. creating, at the data anonymizer, an anonymized identifier corresponding to the person, and sending the anonymized identifier from the regional subsystem to a global opt-out service;

e. using the global opt-out service, searching a global opt-out store in communication with the global opt-out service to identify a record with a matching anonymized identifier; and f. returning to the one of the plurality of regional subsystems from the opt-out service an item of opt-out information corresponding to the person.

11. The method of claim 10, wherein the step of creating, at the data anonymizer, an anonymized identifier corresponding to the person comprises the step of performing a secure hash of the personal data in order to produce the anonymized identifier.

12. The method of claim 10, wherein the step of creating, at the data anonymizer, an anonymized identifier corresponding to the person comprises the step of performing a double hash of the personal data in order to produce the anonymized identifier.

13. The method of claim 12, wherein the step of performing a double hash of the personal data in order to produce the anonymized identifier comprises the steps of performing a first secure hash of the personal data and then performing a second secure hash of the output of such step of performing a first secure hash of the personal data.

14. The method of claim 10, wherein each of the method steps are performed in real time.

15. The method of claim 10, further comprising the step of transmitting update information from one of the plurality of regional subsystems to the opt-out store.

16. The method of claim 15, wherein the step of transmitting update information from one of the plurality of regional subsystems to the opt-out store is performed in real time.

17. The method of claim 15, wherein the step of transmitting update information from one of the plurality of regional subsystems to the opt-out store is performed periodically.

* * * * *